United States Patent
Rolff et al.

(10) Patent No.: US 10,020,506 B2
(45) Date of Patent: Jul. 10, 2018

(54) ACTIVE MATERIAL FOR A CATHODE OF A BATTERY CELL, CATHODE, AND BATTERY CELL

(71) Applicant: Robert Bosch GmbH, Stuttgart (DE)

(72) Inventors: Malte Rolff, Stockelsdorf (DE); Anika Marusczyk, Gelsenkirchen (DE); Thomas Eckl, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 25 days.

(21) Appl. No.: 15/180,170

(22) Filed: Jun. 13, 2016

(65) Prior Publication Data

US 2016/0372747 A1  Dec. 22, 2016

(30) Foreign Application Priority Data

Jun. 17, 2015 (DE) .................. 10 2015 211 110

(51) Int. Cl.
*H01M 4/505* (2010.01)
*H01M 4/36* (2006.01)
*H01M 4/62* (2006.01)
*H01M 4/1315* (2010.01)

(52) U.S. Cl.
CPC ......... *H01M 4/505* (2013.01); *H01M 4/1315* (2013.01); *H01M 4/364* (2013.01); *H01M 4/366* (2013.01); *H01M 4/625* (2013.01)

(58) Field of Classification Search
CPC .... H01M 4/505; H01M 4/1315; H01M 4/364; H01M 4/366; H01M 4/625
See application file for complete search history.

(56) References Cited

U.S. PATENT DOCUMENTS

| | | | |
|---|---|---|---|
| 4,973,534 A | 11/1990 | Adendorff et al. | |
| 6,022,641 A | 2/2000 | Endo et al. | |
| 2011/0052988 A1 | 3/2011 | Beck et al. | |
| 2014/0141331 A1 | 5/2014 | Lee et al. | |
| 2014/0178760 A1 | 6/2014 | Bowling et al. | |

FOREIGN PATENT DOCUMENTS

| | | | |
|---|---|---|---|
| CN | 103078101 | * | 5/2013 |
| CN | 103107326 | * | 5/2013 |
| DE | 102012208321 | | 11/2013 |
| DE | 102012214119 | | 2/2014 |

* cited by examiner

*Primary Examiner* — Laura Weiner

(74) *Attorney, Agent, or Firm* — Norton Rose Fulbright US LLP; Gerard Messina

(57) ABSTRACT

An active material for a cathode of a battery cell which includes a first component containing $Li_2MnO_3$. The first component has been doped with a dopant containing a fluoride of a transition metal. Moreover, a cathode of a battery cell which includes an active material, and a battery cell which includes at least one cathode, are provided.

13 Claims, 2 Drawing Sheets

ACTIVE MATERIAL FOR A CATHODE OF A BATTERY CELL, CATHODE, AND BATTERY CELL

CROSS REFERENCE

The present application claims the benefit under 35 U.S.C. § 119 of German Patent Application No. DE 102015211110.5 filed on Jun. 17, 2015, which is expressly incorporated herein by reference in its entirety.

FIELD

The present invention relates to an active material for a cathode of a battery cell which includes a first component containing $Li_2MnO_3$. Moreover, the present invention relates to a cathode of a battery cell which includes an active material according to the present invention, and a battery cell which includes at least one cathode according to the present invention.

BACKGROUND INFORMATION

Electrical energy may be stored with the aid of batteries. Batteries convert chemical reaction energy into electrical energy. A distinction is made between primary batteries and secondary batteries. Primary batteries are non-rechargeable, while secondary batteries, also referred to as accumulators, are rechargeable. A battery includes one or multiple battery cells.

In particular, so-called lithium-ion battery cells are used in an accumulator. They are characterized, among other features, by high energy densities, thermal stability, and extremely low self-discharge. Lithium-ion battery cells are used, for example, in motor vehicles, in particular in electric vehicles (EVs), hybrid vehicles (HEVs), and plug-in hybrid vehicles (PHEVs).

Lithium-ion battery cells include a positive electrode, also referred to as a cathode, and a negative electrode, also referred to as an anode. The cathode and the anode each include a current collector, to which an active material is applied.

A generic battery is described in German Patent Application No. DE 10 2012 208 321 A1, which includes a cathode whose active material contains a metal oxide and an NCM (Nickel-Cobalt-Manganese) compound. The metal oxide is $Li_2MnO_3$, and the NCM compound is $LiMO_2$, M being selected from the elements nickel, cobalt, and manganese.

The active material for the anode is silicon, for example. However, graphite is also widely used as active material for anodes. Lithium atoms are intercalated into the active material of the anode.

During operation of the battery cell, i.e., during a discharging operation, electrons flow in an external circuit from the anode to the cathode. During a discharging operation, lithium ions migrate from the anode to the cathode within the battery cell. In the process, the lithium ions are reversibly deintercalated from the active material of the anode, also referred to as delithiation. During a charging operation of the battery cell, the lithium ions migrate from the cathode to the anode. In the process, the lithium ions are reversibly reintercalated into the active material of the anode, also referred to as lithiation.

The electrodes of the battery cell have a foil-like design and are wound to form an electrode winding, with a separator situated in between which separates the anode from the cathode.

Such an electrode winding is also referred to as a "jelly roll." The electrodes may also be layered one above the other to form an electrode stack.

The two electrodes of the electrode winding or of the electrode stack are electrically connected via poles of the battery cell, also referred to as terminals. A battery cell generally includes one or multiple electrode windings or electrode stacks. The electrodes and the separator are surrounded by an electrolyte which is generally liquid. The electrolyte is conductive for the lithium ions, and allows transport of the lithium ions between the electrodes.

German Patent Application No. DE 10 2012 831 A1 provides a spinel which is usable as active material for a cathode of a battery cell. The spinel has been doped.

Likewise, U.S. Patent Application Publication No. 2011/0052988 A1 describes an active material for a cathode of a battery cell which has been doped.

In addition, U.S. Pat. No. 4,973,534 describes a cathode for a battery cell whose active material has been doped.

Furthermore, U.S. Pat. No. 6,022,641 A also describes an active material for a cathode of a battery cell which has been doped.

SUMMARY

An active material for a cathode of a battery cell, in particular a lithium-ion battery cell, is provided which includes a first component containing $Li_2MnO_3$, i.e., a metal oxide.

According to the present invention, the first component of the active material has been doped with a dopant containing a fluoride of a transition metal. Due to the doping, a portion of the metal oxide $Li_2MnO_3$, in particular the portion of $MnO_3$, in the first component is replaced by the dopant. The transition metal is capable of undergoing a redox reaction. The transition metal may assume corresponding oxidation states, and is sufficiently electronegative to bind electrons to it and not release them to a neighboring manganese. Thus, the transition metal also takes part in the charge compensation.

Due to the doping, preferably a portion between 1% and 15% of the metal oxide $Li_2MnO_3$, in particular the portion of $MnO_3$, in the first component of the active material of the cathode is replaced by the fluoride of the transition metal via the dopant.

The active material preferably includes a second component which contains $LiTMO_2$, i.e., an NCM compound. TM is a transition metal preferably selected from the elements nickel, cobalt, and manganese. The active material, which includes a metal oxide and an NCM compound, in particular $Li_2MnO_3$ and $LiTMO_2$, allows a relatively large capacity of the battery cell combined with a relatively high voltage.

According to one advantageous embodiment of the present invention, the dopant contains sodium. Due to the doping of the first component, a portion of lithium of the metal oxide $Li_2MnO_3$ is replaced by the sodium of the dopant. The rate capacity of the active material is positively influenced in this way.

The dopant contains in particular a sodium transition metal fluoride according to the following formula:

where $0 \leq x \leq 4$ and $1 \leq y \leq 6$, and M is a transition metal.

Examples of dopants include among other things:

$NiF_2$, $PtF_2$, $CoF_2$, $PdF_2$, in each case not containing sodium, i.e., with x=0, and $NaMF_3$, $Na_3MF_6$, $Na_4MF_6$, in each case containing sodium, i.e., with x≤1.

Transition metal M is preferably selected from the elements nickel, cobalt, platinum, and palladium. The elements nickel, cobalt, platinum, and palladium have an ion radius that is similar to the ion radius of manganese. Therefore, these elements are particularly well suited for the doping of the metal oxide $Li_2MnO_3$. Nickel, cobalt, platinum, and palladium also have a relatively high electronegativity. Ni and Co are slightly more electronegative than Mn. Pt and Pd are even more electronegative than Ni and Co. Pt and Pd also have a slightly larger ion radius than Mn.

The transition metals nickel and cobalt in particular are also less expensive than Pt and Pd. Nickel and cobalt are also generally contained in the NCM compound of the second component of the active material of the cathode. Problems which may be caused by incompatibility of the transition metals may thus be greatly reduced or even eliminated.

The initially inactive first component of the active material of the cathode, which contains the metal oxide $Li_2MnO_2$, is activated during formation of the battery cell, with irreversible elimination of oxygen. The formation of the battery cell takes place in that a defined voltage is applied to the battery cell for the first time, and a defined current flows through the battery cell for the first time. Such a process for forming a battery cell, in which formation currents are applied to the battery cell to activate electrochemical processes, is described in German Patent Application No. DE 10 2012 214 119 A1, for example.

The doping of the first component, which contains the metal oxide $Li_2MnO_3$, takes place prior to the formation and activation of the battery cell. Due to the doping, the required activation energy of the first component of the active material of the cathode containing the metal oxide $Li_2MnO_3$ is reduced. During the activation, the irreversible oxygen loss likewise decreases due to the doping. This results in fewer defects in the active material of the cathode, through which transition metals, such as manganese in particular, may later migrate. The doping thus results in stabilization of the structure of the active material of the cathode, and thus, stabilization of the voltage and the capacity of the battery cell with the cathode.

During the doping, portions of the $Mn^{4+}$ atoms and $O^{2-}$ atoms of the metal oxide $Li_2MnO_3$ are replaced by the sodium transition metal fluoride. For example, when doping is carried out with $NiF_2$, two $O^{2-}$ atoms are replaced by two F atoms, and one $Mn^{4+}$ atom is replaced by one $Ni^{2+}$ atom, which is oxidized to an $Ni^{4+}$ atom during delithiation. When doping is carried out with $PtF_2$, one $Mn^{4+}$ atom is replaced by one $Pt^{2+}$ atom, which is oxidized to a $Pt^{4+}$ atom during delithiation; when doping is carried out with $CoF_2$, one $Mn^{4+}$ atom is replaced by one $Co^{2+}$ atom, which is oxidized to a $Co^{4+}$ atom during delithiation; and when doping is carried out with $PdF_2$, one $Mn^{4+}$ atom is replaced by one $Pd^{2+}$ atom, which is oxidized to a $Pd^{4+}$ atom during delithiation.

For example, when doping is carried out with $NaMF_3$, one $Mn^{4+}$ atom is replaced by one $M^{2+}$ atom, which is oxidized to an $M^{4+}$ atom during delithiation; when doping is carried out with $Na_3MF_6$, one $Mn^{4+}$ atom is replaced by one $M^{3+}$ atom, which is oxidized to an $M^{4+}$ atom during delithiation; and when doping is carried out with $Na_4MF_6$, one $Mn^{4+}$ atom is replaced by one $M^{2+}$ atom, which is oxidized to an $M^{4+}$ atom during delithiation. M is a transition metal preferably selected from the elements nickel, cobalt, platinum, and palladium.

The doping of the first component of the active material of the cathode containing the metal oxide $Li_2MnO_3$ with the dopant containing the sodium transition metal fluoride generally results in a material according to the following formula:

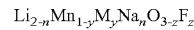

$$Li_{2-n}Mn_{1-y}M_yNa_nO_{3-z}F_z$$

where y>0, z>0, and n≥0, and M is a transition metal preferably selected from the elements nickel, cobalt, platinum, and palladium.

The doping generally results in an active material of the cathode which includes a first component containing the metal oxide $Li_2MnO_3$ and the dopant, and a second component containing the NCM compound $LiTMO_2$ according to the following formula:

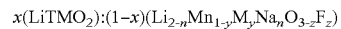

$$x(LiTMO_2):(1-x)(Li_{2-n}Mn_{1-y}M_yNa_nO_{3-z}F_z)$$

where x<1, y>0, z>0, and n≤0, and M is a transition metal preferably selected from the elements nickel, cobalt, platinum, and palladium, and TM is a transition metal preferably selected from the elements nickel, cobalt, and manganese.

Moreover, a cathode of a battery cell is provided which includes an active material according to the present invention.

According to one advantageous refinement of the present invention, a cathode coating containing $AlF_3$ is applied to the active material of the cathode. A coating of aluminum fluoride on the active material of the cathode has a positive effect on the capacity of the battery cell.

In particular, the cathode coating prevents or reduces contact of the active material of the cathode with an electrolyte contained in the battery cell. Elutriation of transition metals from the active material of the cathode and migration of elutriated transition metals to the anode of the battery cell are likewise prevented or reduced.

According to another advantageous refinement of the present invention, a cathode coating containing carbon is applied to the active material of the cathode. Such a cathode coating ensures homogeneous electronic contacting of the cathode.

The $AlF_3$-containing cathode coating and the carbon-containing cathode coating may also be applied to the active material of the cathode together, in particular one above the other, i.e., in layers.

Furthermore, a battery cell is provided which includes at least one cathode according to the present invention.

A battery cell according to the present invention is advantageously used in an electric vehicle (EV), in a hybrid vehicle (HEV), in a plug-in hybrid vehicle (PHEV), in a tool, or in a consumer electronic product. Tools are understood in particular to mean tools for home use and garden tools. Consumer electronic products are understood in particular to mean mobile telephones, tablet PCs, or notebooks.

Due to the doping of the metal oxide in the active material of the cathode with a dopant containing a fluoride of a transition metal, the voltage of the lithium-ion battery cell remains stable over a relatively long time period and a large number of cycles. Likewise, the capacity of the lithium-ion battery cell remains stable over a relatively long time period and a large number of cycles. Losses in voltage and capacity are significantly reduced. The service life of the battery is thus increased, thus enabling commercial use in particular of lithium-ion batteries with an NCM compound in the active material of the cathode.

BRIEF DESCRIPTION OF THE DRAWINGS

Specific embodiments of the present invention of the present invention are explained in greater detail below with reference to the figures and the description below.

DETAILED DESCRIPTION OF EXAMPLE EMBODIMENTS

Figure 1:
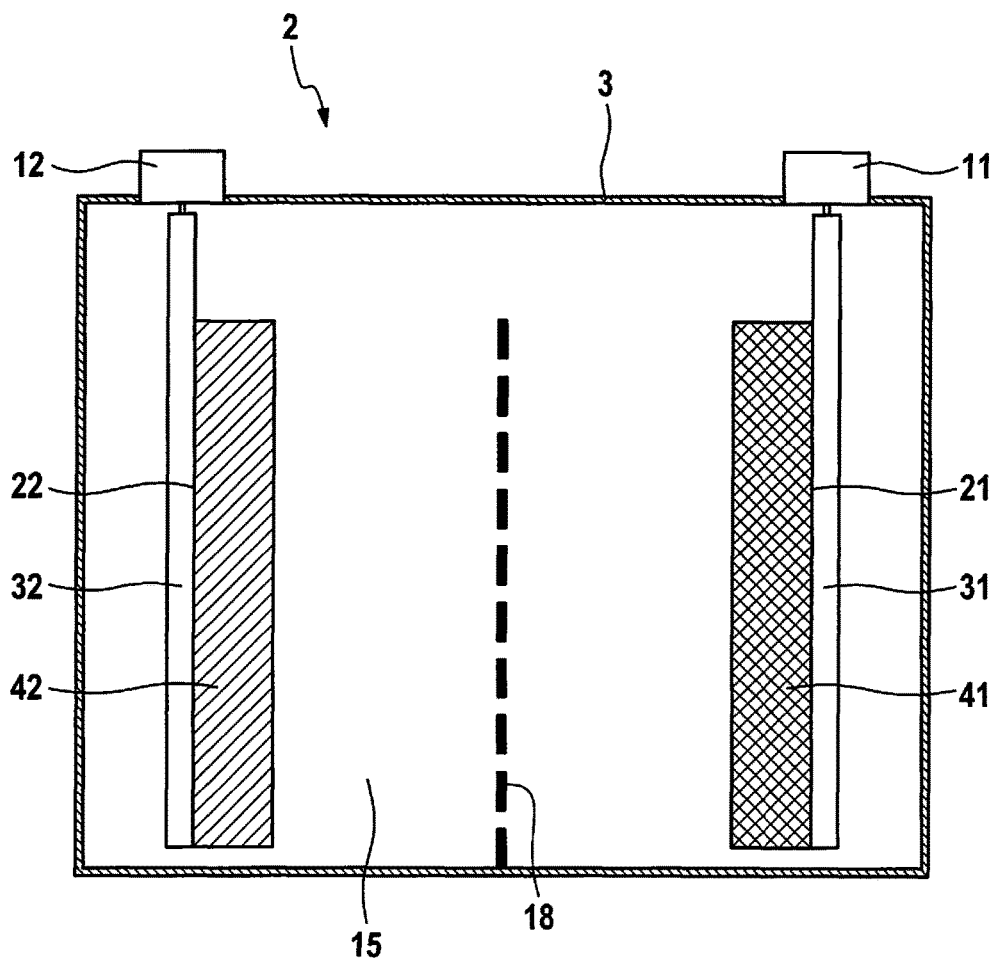
FIG. 1 shows a schematic illustration of a battery cell.

A battery cell 2 is schematically illustrated in FIG. 1. Battery cell 2 includes a cell housing 3 having a prismatic design, in the present case a cuboidal design. In the present case, cell housing 3 has an electrically conductive design and is made of aluminum, for example. However, cell housing 3 may also be made of an electrically insulating material, for example plastic.

Battery cell 2 includes a negative terminal 11 and a positive terminal 12. A voltage provided by battery cell 2 may be tapped via terminals 11, 12. In addition, battery cell 2 may also be charged via terminals 11, 12. Terminals 11, 12 are situated spaced apart from one another on a top surface of prismatic cell housing 3.

An electrode winding which includes two electrodes, namely, an anode 21 and a cathode 22, is situated within cell housing 3 of battery cell 2. Anode 21 and cathode 22 each have a foil-like design, and are wound to form an electrode winding with a separator 18 situated in between. It is also conceivable to provide multiple electrode windings in cell housing 3. An electrode stack, for example, may also be provided instead of the electrode winding.

Anode 21 includes an anodic active material 41 which has a foil-like design. Anodic active material 41 contains silicon or a silicon-containing alloy as the base material.

Anode 21 also includes a current collector 31, which likewise has a foil-like design. Anodic active material 41 and current collector 31 are placed flatly against one another and joined together. Current collector 31 of anode 21 has an electrically conductive design and is made of a metal, for example copper. Current collector 31 of anode 21 is electrically connected to negative terminal 11 of battery cell 2.

In the present case, cathode 22 is a high-energy (HE) nickel-cobalt-manganese (NCM) cathode. Cathode 22 includes a cathodic active material 42 which is present in particle form. Additives, in particular conductive carbon black and binder, are situated between the particles of cathodic active material 42. Cathodic active material 42 and the additives form a composite which has a foil-like design.

Cathodic active material 42 includes a first component containing $Li_2MnO_3$. The first component of cathodic active material 42 also has been doped with a dopant containing a fluoride of a transition metal. The transition metal is nickel, cobalt, platinum, or palladium, for example. Other transition metals, for example titanium, niobium, molybdenum, or tungsten, are also conceivable.

The dopant may additionally contain sodium. The dopant is generally a sodium transition metal fluoride according to the following formula:

$Na_xMF_y$ where $0 \leq x \leq 4$ and $1 \leq y \leq 6$, and M is a transition metal, in particular nickel, cobalt, platinum, or palladium.

Cathodic active material 42 also includes a second component containing an NCM compound, namely, $LiTMO_2$. TM is a transition metal selected in particular from nickel, cobalt, and manganese. Other transition metals, for example titanium, niobium, molybdenum, or tungsten, are also conceivable. Further components of cathodic active material 42 are in particular PVDF binder, graphite, and carbon black.

Cathode 22 also includes a current collector 32 which likewise has a foil-like design. The composite, made up of cathodic active material 42 and the additives, and current collector 32 are placed flatly against one another and joined together.

Current collector 32 of cathode 22 has an electrically conductive design and is made of a metal, for example aluminum. Current collector 32 of cathode 22 is electrically connected to positive terminal 12 of battery cell 2.

Anode 21 and cathode 22 are separated from one another by separator 18. Separator 18 likewise has a foil-like design. Separator 18 has an electronically insulating design, but is ionically conductive, i.e., is permeable by lithium ions.

Cell housing 3 of battery cell 2 is filled with a liquid electrolyte 15 or with a polymer electrolyte. Electrolyte 15 surrounds anode 21, cathode 22, and separator 18. Electrolyte 15 is also ionically conductive.

Figure 2:
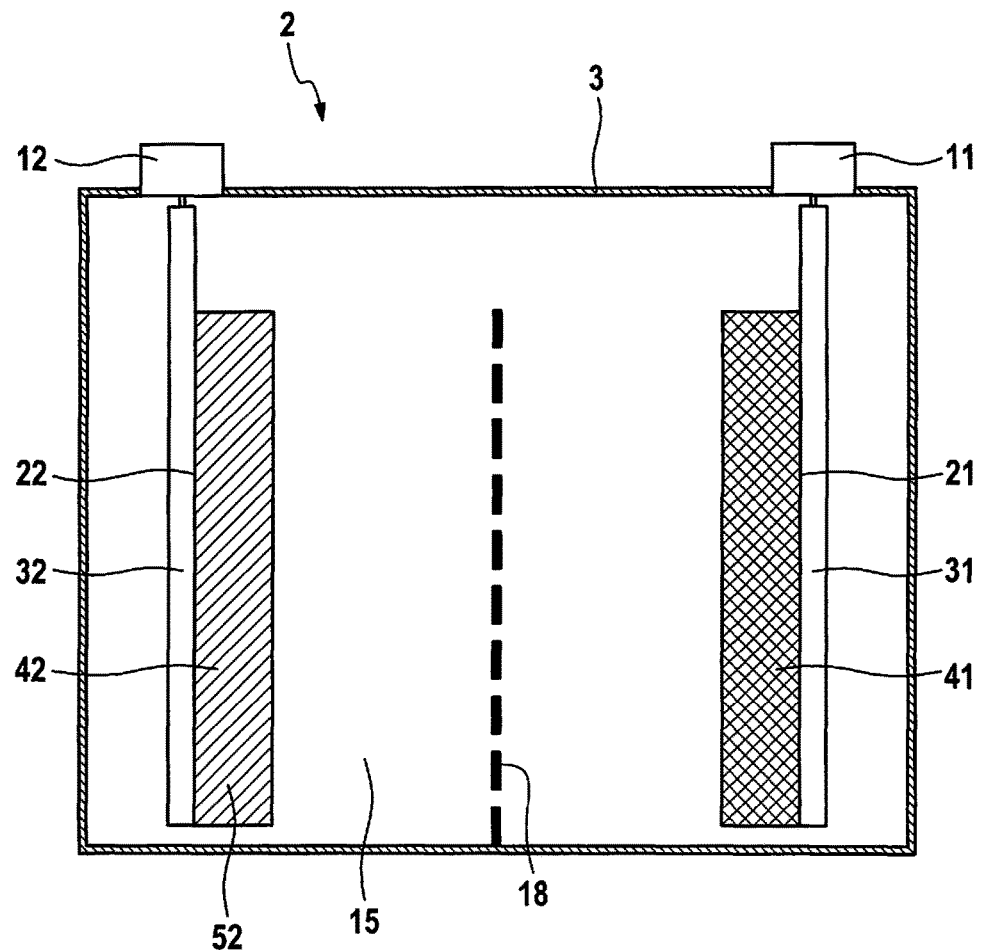
FIG. 2 shows a schematic illustration of a modification of the battery cell from FIG. 1.

FIG. 2 schematically illustrates a modification of battery cell 2 from FIG. 1. Modified battery cell 2 likewise includes a cell housing 3 which has a prismatic design, in the present case a cuboidal design. Battery cell 2 is very similar to battery cell 2 from FIG. 1. Therefore, in particular differences from battery cell 2 from FIG. 1 are discussed below.

A cathode coating 52 is applied to the particles of cathodic active material 42. The particles of cathodic active material 42 are enclosed by cathode coating 52. Cathode coating 52 thus envelops the particles of cathodic active material 42.

In the present case, cathode coating 52 contains aluminum fluoride ($AlF_3$). Cathode coating 52 prevents or reduces contact of cathodic active material 42 with electrolyte 15 contained in cell housing 3 of battery cell 2. Elutriation of transition metals from cathodic active material 42 and migration of elutriated transition metals to anode 21 of battery cell 2 are likewise prevented or reduced.

Cathode coating 52 may also contain carbon. A cathode coating 52 of this type ensures homogeneous electronic contacting of cathode 22. Cathode coating 52 may in particular have a multilayer design, and, for example, may contain a layer of aluminum fluoride ($AlF_3$) and a layer of carbon.

The present invention is not limited to the exemplary embodiments described here and the aspects highlighted therein. Rather, numerous modifications are within the scope of activities carried out by those skilled in the art.

What is claimed is:

1. A cathode for a battery cell, comprising:
   a first component containing $Li_2MnO_3$, wherein the first component is doped with a dopant containing a fluoride of a transition metal;
   wherein one of the following is satisfied: (i) a cathode coating containing $AlF_3$ is applied to the active material, or (ii) a cathode coating containing carbon is applied to the active material.

2. The cathode active material as recited in claim 1, wherein the active material includes a second component containing $LiTMO_2$, TM being a transition metal that is selected from the elements nickel, cobalt, and manganese.

3. The cathode as recited in claim 1, wherein the dopant contains sodium.

4. The cathode as recited in claim 1, wherein the dopant contains $Na_xMF_y$, where $0 \leq x \leq 4$ and $1 \leq y \leq 6$, and M is a transition metal.

5. The cathode as recited in claim 4, wherein M is selected from the elements nickel, cobalt, platinum, and palladium.

6. The cathode as recited in claim 1, wherein the cathode coating containing the $AlF_3$ is applied to the active material.

7. The cathode as recited in claim 1, wherein the cathode coating containing the carbon is applied to the active material.

8. A battery cell, comprising:
- at least one cathode, the cathode including an active material the active material including a first component containing $Li_2MnO_3$, wherein the first component is doped with a dopant containing a fluoride of a transition metal;
- wherein one of the following is satisfied: (i) a cathode coating containing $AlF_3$ is applied to the active material, or (ii) a cathode coating containing carbon is applied to the active material.

9. The battery cell as recited in claim 8, wherein the cathode coating containing the $AlF_3$ is applied to the active material.

10. The battery cell as recited in claim 8, wherein the cathode coating containing the carbon is applied to the active material.

11. A method of using a battery cell, the method comprising:
- providing, in one of an electric vehicle, a hybrid vehicle, a plug-in hybrid vehicle, a tool, or a consumer electronic product, a battery cell, the battery cell including at least one cathode, the cathode including an active material, the active material including a first component containing $Li_2MnO_3$, wherein the first component is doped with a dopant containing a fluoride of a transition metal; and
- using the battery cell;
- wherein one of the following is satisfied: (i) a cathode coating containing $AlF_3$ is applied to the active material, or (ii) a cathode coating containing carbon is applied to the active material.

12. The method as recited in claim 11, wherein the cathode coating containing the $AlF_3$ is applied to the active material.

13. The method as recited in claim 11, wherein the cathode coating containing the carbon is applied to the active material.

* * * * *